(12) United States Patent  (10) Patent No.: US 7,854,444 B2
Zhuang  (45) Date of Patent: Dec. 21, 2010

(54) CONVERTIBLE UTILITY CART

(76) Inventor: James Jia Zhuang, 5728 Sterling Oaks Dr., Brentwood, TN (US) 37027

( * ) Notice: Subject to any disclaimer, the term of this patent is extended or adjusted under 35 U.S.C. 154(b) by 908 days.

(21) Appl. No.: 11/716,483

(22) Filed: Mar. 9, 2007

(65) Prior Publication Data

US 2008/0217503 A1  Sep. 11, 2008

(51) Int. Cl.
*B62B 3/02* (2006.01)
(52) U.S. Cl. .................... 280/651; 280/79.3
(58) Field of Classification Search .......... 280/47.34, 280/47.35, 79.11, 79.3, 651, 30
See application file for complete search history.

(56) References Cited

U.S. PATENT DOCUMENTS

| | | | | |
|---|---|---|---|---|
| 3,197,224 | A * | 7/1965 | Kappen | ............ 280/651 |
| 3,762,739 | A * | 10/1973 | Tabet | ............ 280/47.371 |
| 4,032,165 | A * | 6/1977 | Russell | ............ 280/79.3 |
| 4,099,735 | A | 7/1978 | Becker, III | |
| 5,090,725 | A | 2/1992 | Feldner | |
| 5,190,305 | A | 3/1993 | Putman | |
| 5,460,391 | A * | 10/1995 | Gantz et al. | ............ 280/30 |
| 7,219,904 | B1 * | 5/2007 | Boom et al. | ............ 280/79.3 |
| 7,658,388 | B1 * | 2/2010 | Rodriguez et al. | ............ 280/30 |
| 2005/0140119 | A1 * | 6/2005 | Wong | ............ 280/651 |

* cited by examiner

*Primary Examiner*—Frank B Vanaman
(74) *Attorney, Agent, or Firm*—Tim Tingkang Xia; Morris, Manning & Martin, LLP

(57) ABSTRACT

A convertible cart capable of being converted into a Bellman luggage cart, platform cart, or dolly cart. The convertible cart includes: (a) a platform having a third width, $W_3$, (b) a first frame having a first width, $W_1$, detachably coupled to the platform at a first position, (c) a second frame having a second width, $W_2$, detachably coupled to the platform at a second position apart from the first position, (d) first coupling connector configured to detachably engage the first and second frame, respectively, with the platform, (e) a third frame having two ends detachably coupled to the first and second frame, respectively, (f) second coupling connector means detachably engage the third frame with the first and the second frame, respectively, and (g) a plurality of wheels operable mounted to the platform, in which $W_3 > W_2 > W_1$.

27 Claims, 11 Drawing Sheets

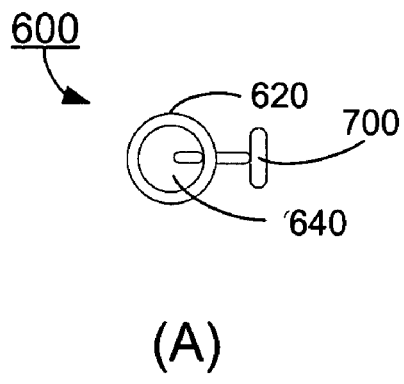
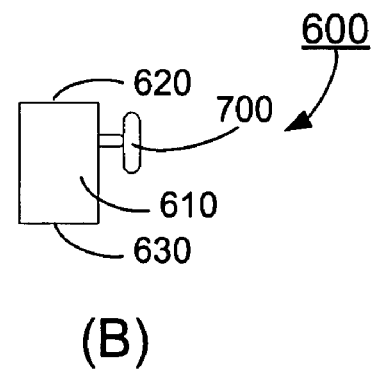
FIG. 6
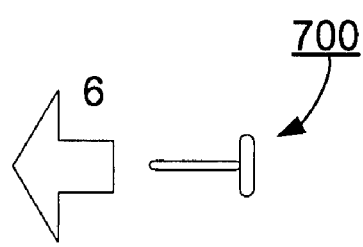
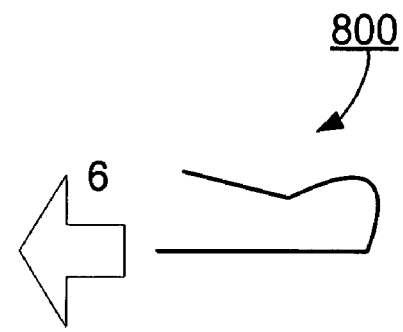
FIG. 7  FIG. 8

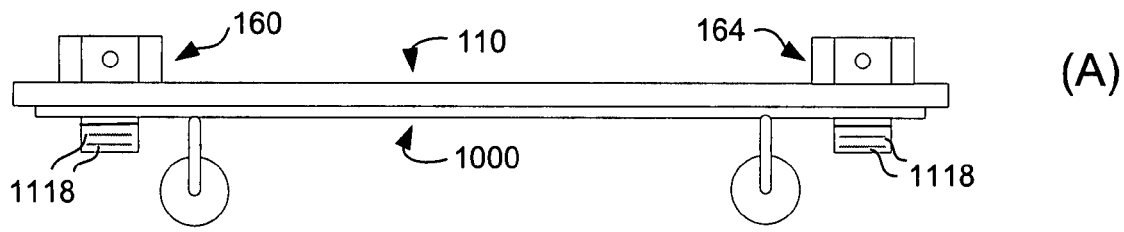
(A)
(B)
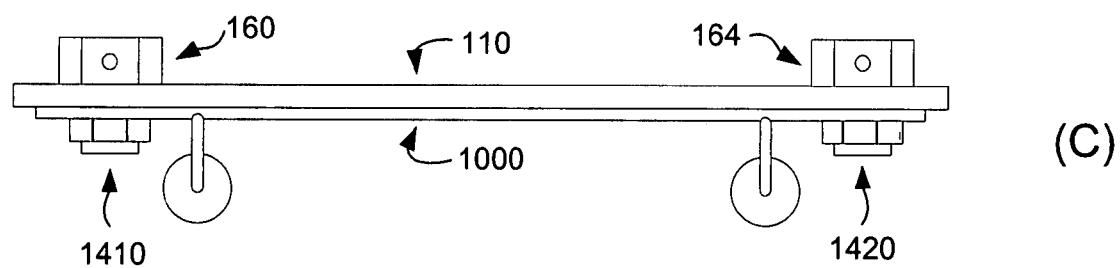
(C)
FIG. 12

CONVERTIBLE UTILITY CART

CROSS-REFERENCE TO RELATED PATENT APPLICATION

Some references, if any, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention generally relates to utility carts, and in particular relates to a convertible cart.

BACKGROUND OF THE INVENTION

Currently, a Bellman cart, platform dolly and furniture moving dolly, or moving dolly, are three different, individual, moving equipments. One would need three separate pieces of equipments for carrying out three different types of moving tasks. There is no Bellman cart available that can be converted into a platform dolly or moving dolly. Further, no Bellman cart in prior art can be configured into a smaller piece for storage. Nor is there a platform dolly in the market that can be converted into a moving dolly. Moreover, current Bellman carts occupy a large space for storage and are not easy to transport because they cannot be dissembled into small pieces.

Therefore, a heretofore unaddressed need exists in the art to address the aforementioned deficiencies and inadequacies, especially in connection with the making of an efficient, cost saving cart to effectively carry out the tasks that would require a Bellman cart, platform cart and moving dolly, and supply a meaningful, multi-functional, space saving moving cart for industry, family or individual.

SUMMARY OF THE INVENTION

The present invention, in one aspect, relates to a convertible cart that can be easily converted into a Bellman cart, a platform cart, or a moving dolly cart. In one embodiment, the convertible cart has (a) a base frame, (b) a platform, (c) a first frame, (d) a second frame, (e) a third frame, (f) a plurality of first coupling connectors, (g) a pair of second coupling connectors, and (h) a plurality of wheels.

In one embodiment, the base frame has a body portion defined by a first end, an opposite, second end, a first side, and an opposite, second side. The body portion has a top surface and a bottom surface and a third width, $W_3$, defined by the first side and the second side, and is detachably mounted on the base frame.

In one embodiment, the first frame has a first support member, a second support member, and a top support member connected to the first and second support members at its ends, respectively. The first support member and the second support member are substantially parallel to each other and define a first width, $W_1$. The first frame is detachably coupled to the body portion of the platform adjacent to the first end. When the first frame is at a vertical position, the first support member and the second support member are substantially perpendicular to the body portion and the top support member is apart from the top surface of the body portion in a distance $l_1$.

The second frame has a first support member, a second support member, and a top support member connected to the first support member and second support members at its ends, respectively. The first support member and the second support member are substantially parallel to each other and define a second width, $W_2$. The second frame is detachably coupled to the body portion of the platform adjacent to the second end. When the second frame is at a vertical position, the first support member and the second support member are substantially perpendicular to the body portion and the top support member is apart from the top surface of the body portion in a distance $l_2$.

The plurality of first coupling connectors are configured to detachably engage a corresponding one of the first support member and the second support member of the first frame, and the first support member and the second support member of the second frame, respectively, with the platform.

The third frame has a first support member, a second support member, and a top support member connected to the first and second support members at its ends, respectively. The first support member and the second support member are substantially parallel to each other. The first support member is detachably coupled to one of the first frame and the second frame, and the second support member is detachably coupled to the other one of the first frame and the second frame, respectively. The top support member of the third frame is substantially perpendicular to the top support member of the first frame and the top support member of the second frame.

The one of the pair of second coupling connectors is configured to detachably engage the first support member of the third frame with the top support member of the first frame. The other one of the pair of second coupling connectors is configured to detachably engage the second support member of the third frame with the top support member of the second frame, respectively.

The plurality of wheels is operable and is mounted to the base frame. In one embodiment, the convertible cart has at least three wheels. In one embodiment, the width $W_3$ of the platform is greater than the width $W_2$ of the second frame. The width $W_2$ of the second frame is greater than the width $W_1$ of the first frame. The height of the first frame $l_1$ and the height of the second frame $l_2$ are about or substantially equal.

In one embodiment, each of the plurality of first coupling connectors is a 2-way T connector, a 3-way T connector, or any combinations of these connectors. Each of the plurality of first coupling connectors has a first shaft and a second shaft perpendicularly coupled to the first shaft. The first shaft is configured to detachably engage a corresponding one of the first support member, and the second support member of the first frame, the first support member, and the second support member of the second frame, when the first frame and the second frame are in a vertical, erected position, respectively. The second shaft is configured to detachably engage a corresponding one of the first support member, and the second support member of the first frame, the first support member, and the second support member of the second frame, when the first frame and the second frame are in a horizontal, non-erected position, respectively.

The first shaft has at least a part of its body portion penetrated through the platform and the base frame. The body portion of the first shaft penetrated through the platform has a helical groove or thread formed on surface of the first shaft.

The first shaft has a first body portion defined by a first end and an opposite, second end. The second shaft has a second body portion defined by a first end and a second, opposite end.

The first body portion has a first channel and the second body portion has a second channel. These channels are formed at the center of the body portions so as to detachably engage a corresponding one of the first support member, and the second support member of the first frame, the first support member, and the second support member of the second frame, respectively.

Each of the first channel and the second channel extends from its first end to its second end of each of the corresponding first shaft and the second shaft, respectively.

In one embodiment, each of the pair of second coupling connectors has a body portion defined by a first end and an opposite, second end. Each body portion of the pair of second coupling connectors having a respective channel configured to detachably engage a corresponding one of the first support member and the second support member of the third frame, respectively.

The first frame and the second frame are erected from the base frame. The third frame is erected from the first frame and the second frame so as to form a luggage cart.

In one embodiment, when the third frame is detached from the pair of second coupling connectors, and the first frame is detached from the two of the plurality of first coupling connectors, a platform cart is formed. In another embodiment, when the third frame is detached from the pair of second coupling connectors, and the first frame adapts a horizontal, non-erected position, another platform cart is formed.

In one embodiment, when the first frame, the second frame and the third frame are all removed, a dolly cart is formed. In another embodiment, when the first frame and the second frame both adapt a horizontal, non-erected position and the third frame is detached from the pair of second coupling connectors, another dolly cart is formed. In a further embodiment, when the first frame and the second frame both adapt a horizontal, non-erected position and the third frame is stowed away under the base frame, yet another dolly cart is formed.

In one embodiment, the convertible cart also has a pair of third coupling connectors mounted underneath the base frame. Each of the pair of third coupling connectors is configured to detachably engage a corresponding one of the first support member and the second support member of the third frame, respectively. The first of the pair of third coupling connector extends substantially parallel to and spaced apart from the second third coupling connector at a distance that is substantially the same as the width of the first and second support member and the second support member of the third frame.

Each of the pair of third coupling connectors has a first panel mountable to the base frame, and a tubular member mounted onto the first panel. The tubular member is configured to detachably engage a corresponding one of the first support member and the second support member of the third frame, respectively. The tubular member of the pair of third coupling connectors has a body portion defined by a first end, and an opposite, second end. The body portion has a respective channel configured to detachably engage a corresponding one of the first support member and the second support member of the third frame, respectively.

The channel in the body portion of the tubular member of the pair of third coupling connectors extends from the first end to the second end. The first panel of each of the pair of third coupling connectors is mounted to the base frame by at least a corresponding one of a plurality of screws.

The first support member and the second supporting member of the third frame are detachably engaged with the pair of third coupling connectors, respectively.

In one embodiment, each of the plurality of first coupling connectors is held in place by a corresponding nut.

In one embodiment, the first support member, the second support member, and the top support member of the first frame form an integral frame. The first support member, the second support member, and the top support member of the second frame form an integral frame. The first support member, the second support member, and the top support member of the third frame form an integral frame.

In another aspect, the present invention relates to a convertible cart. In one embodiment, the convertible cart has (a) a platform, (b) a first frame, (c) a second frame, (d) a third frame, (e) a plurality of first coupling connectors, (f) a pair of second coupling connectors, and (g) a plurality of wheels.

In one embodiment, the base frame has a body portion with a third width, $W_3$. The first frame has a first support member, a second support member, and a top support member connected to the first and second support members at its ends, respectively. The first support member and the second support member are substantially parallel to each other and define a first width, $W_1$. The first frame is detachably coupled to the body portion of the platform adjacent to the first end.

The second frame has a first support member, a second support member, and a top support member connected to the first support member and second support members at its ends, respectively. The first support member and the second support member are substantially parallel to each other and define a second width, $W_2$. The second frame is detachably coupled to the body portion of the platform.

The plurality of first coupling connectors are configured to detachably engage a corresponding one of the first support member and the second support member of the first frame, and the first support member and the second support member of the second frame, respectively, with the platform.

The third frame has a first support member, a second support member, and a top support member connected to the first and second support members at its ends, respectively. The first support member and the second support member are substantially parallel to each other. The first support member is detachably coupled to one of the first frame and the second frame, and the second support member is detachably coupled to the other one of the first frame and the second frame, respectively.

The one of the pair of second coupling connectors is configured to detachably engage the first support member of the third frame with the top support member of the first frame. The other one of the pair of second coupling connectors is configured to detachably engage the second support member of the third frame with the top support member of the second frame, respectively.

The plurality of wheels is operable and is mounted to the base frame. In one embodiment, the convertible cart has at least three wheels. In one embodiment, the width $W_3$ of the platform is greater than the width $W_2$ of the second frame. The width $W_2$ of the second frame is greater than the width $W_1$ of the first frame.

In one embodiment, each of the plurality of first coupling connectors is a 2-way T connector, a 3-way T connector, or any combinations of these connectors. Each of the plurality of first coupling connectors has a first shaft and a second shaft perpendicularly coupled to the first shaft. The first shaft is configured to detachably engage a corresponding one of the first support member, and the second support member of the first frame, the first support member, and the second support member of the second frame, when the first frame and the second frame are in a vertical, erected position, respectively. The second shaft is configured to detachably engage a corresponding one of the first support member, and the second support member of the first frame, the first support member, and the second support member of the second frame, when the first frame and the second frame are in a horizontal, non-erected position, respectively.

The first shaft has at least a part of its body portion penetrated through the platform and the base frame. The body portion of the first shaft penetrated through the platform has a helical groove or thread formed on surface of the first shaft.

The first shaft has a first body portion defined by a first end and an opposite, second end. The second shaft has a second body portion defined by a first end4 and a second, opposite end. The first body portion has a first channel and the second body portion has a second channel. These channels are formed at the center of the body portions so as to detachably engage a corresponding one of the first support member, and the second support member of the first frame, the first support member, and the second support member of the second frame, respectively.

Each of the first channel and the second channel extends from its first end to its second end of each of the corresponding first shaft and the second shaft, respectively.

In one embodiment, each of the pair of second coupling connectors has a body portion defined by a first end and an opposite, second end. Each body portion of the pair of second coupling connectors having a respective channel configured to detachably engage a corresponding one of the first support member and the second support member of the third frame, respectively.

The first frame and the second frame are erectable from the base frame. The third frame is erectable from the first frame and the second frame so as to form a luggage cart.

In one embodiment, when the third frame is detached from the pair of second coupling connectors, and the first frame is detached from the two of the plurality of first coupling connectors, a platform cart is formed. In another embodiment, when the third frame is detached from the pair of second coupling connectors, and the first frame adapts a horizontal, non-erected position, another platform cart is formed.

In one embodiment, when the first frame, the second frame and the third frame are all removed, a dolly cart is formed. In another embodiment, when the first frame and the second frame both adapt a horizontal, non-erected position and the third frame is detached from the pair of second coupling connectors, another dolly cart is formed. In a further embodiment, when the first frame and the second frame both adapt a horizontal, non-erected position and the third frame is stowed away under the base frame, yet another dolly cart is formed.

In one embodiment, each of the plurality of first coupling connectors is held in place by a corresponding nut.

In one embodiment, the first support member, the second support member, and the top support member of the first frame form an integral frame. The first support member, the second support member, and the top support member of the second frame form an integral frame. The first support member, the second support member, and the top support member of the third frame form an integral frame.

In yet another aspect, the present invention relates to yet another convertible cart. In one embodiment, the convertible cart has (a) a platform with a third width, $W_3$, (b) a first frame with a width $W_1$, and detachably coupled to the platform, (c) a second frame with a second width, $W_2$, and detachably coupled to the platform at a position apart from where the first frame is detachably coupled to the platform, (d) a plurality of first coupling connectors configured to detachably engage the first frame and the second frame, respectively, with the platform, (e) a third frame having two ends detachably coupled to the first frame and the second frame, respectively, (f) a pair of second coupling connectors detachably engage the third frame with the first frame and the second frame, respectively, and (g) a plurality of wheels operable mounted to the platform. In one embodiment, the width $W_3$ of the platform is greater than the width $W_2$ of the second frame. The width $W_2$ of the second frame is greater than the width $W_1$ of the first frame.

In one embodiment, each of the plurality of first coupling connectors is a 2-way T connector, a 3-way T connector, or any combinations of these connectors.

The plurality of first coupling connectors has a first shaft and a second shaft perpendicularly connected to the first shaft. The first shaft is configured to detachably engage a corresponding one of the first frame and the second frame when both frames are in a vertical, erected position, respectively. The second shaft is configured to detachably engage a corresponding one of the first frame and second frame when both frames are in a horizontal, non-erected position, respectively.

In one embodiment, the first shaft of plurality of first coupling connectors has part of its body portion penetrate through the platform. The body portion of the first shaft of the plurality of first coupling connectors penetrating through the platform has a helical groove or a thread formed on surface of the first shaft.

The first shaft of the plurality of first coupling connectors has a body portion defined by a first end and an opposite, second end. The second shaft of the plurality of first coupling connectors has a body portion defined by a first side and a second, opposite side. Each body portion of the first shaft and the second shaft has a respective channel, formed at the center so as to detachably engage a corresponding one of the first frame and the second frame, respectively.

Each channel of the first shaft and the second shaft extends from the first end to the second end of each body portion of corresponding first shaft and second shaft of the plurality of first coupling connectors, respectively.

In one embodiment, the pair of second coupling connectors has a body portion defined by a first end and an opposite, second end. Each body portion of the pair of second coupling connectors has a respective channel configured to detachably couple the third frame to the first frame and the second frame, respectively.

When the first frame, the second frame, and third frame are erected, a luggage cart is formed.

When the first frame is detached from two of the plurality of first coupling connectors and the third frame is detached from the pair of second coupling connectors, a platform cart is formed.

When the first frame adapts a horizontal, non-erected position and the third frame is detached from the pair of second coupling connectors, a platform cart is formed.

When the first frame and the second frame both adapt a horizontal, non-erected position and the third frame is detached from the pair of second coupling connectors, a dolly cart is formed.

In one embodiment, each of the plurality of first coupling connectors is held in place by a corresponding nut.

Therefore, the present invention relates to a convertible cart that is capable of being readily and flexibly configured to provide a Bellman luggage cart, a platform cart, or a dolly cart.

Moreover, the present invention relates to a multi-purpose utility cart that is compact, flexible, versatile, user-friendly and easily portable and suitable for use in stores, offices and homes.

These and other aspects will become apparent from the following description of the preferred embodiment taken in conjunction with the following drawings, although variations and modifications therein may be affected without departing from the spirit and scope of the novel concepts of the disclosure.

The accompanying drawings illustrate one or more embodiments of the invention and, together with the written description, serve to explain the principles of the invention. Wherever possible, the same reference numbers are used throughout the drawings to refer to the same or like elements of an embodiment.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 6A is a top view and FIG. 6B is a side view of one of a pair of second coupling connectors according to one embodiment of the present invention;

FIG. 7 shows a locking wing nut for locking the plurality of first coupling connectors or a pair of second coupling connectors according to one embodiment of the present invention;

FIG. 8 shows a locking pin for locking the plurality of first coupling connectors or a pair of second coupling connectors according to one embodiment of the present invention;

FIG. 12A shows a side view of a platform with a plurality of first coupling connectors in place, FIG. 12B shows a pair of nuts for fastening the plurality of first coupling connectors, and FIG. 12C shows a side view of the platform with the plurality of first coupling connectors installed, according to one embodiment of the present invention;

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, the term "horizontal," as used herein, refers to "parallel to level ground." The term "vertical," as used herein, refers to being in a position or direction perpendicular to the plane of the horizon; upright.

The description will be made as to the embodiments of the present invention in conjunction with the accompanying drawings of FIGS. 1-15. In accordance with the present invention, as embodied and broadly described herein, this invention in one aspect relates to a convertible cart that is capable of being configured into a Bellman luggage cart, a platform cart or a dolly cart.

Figure 1:
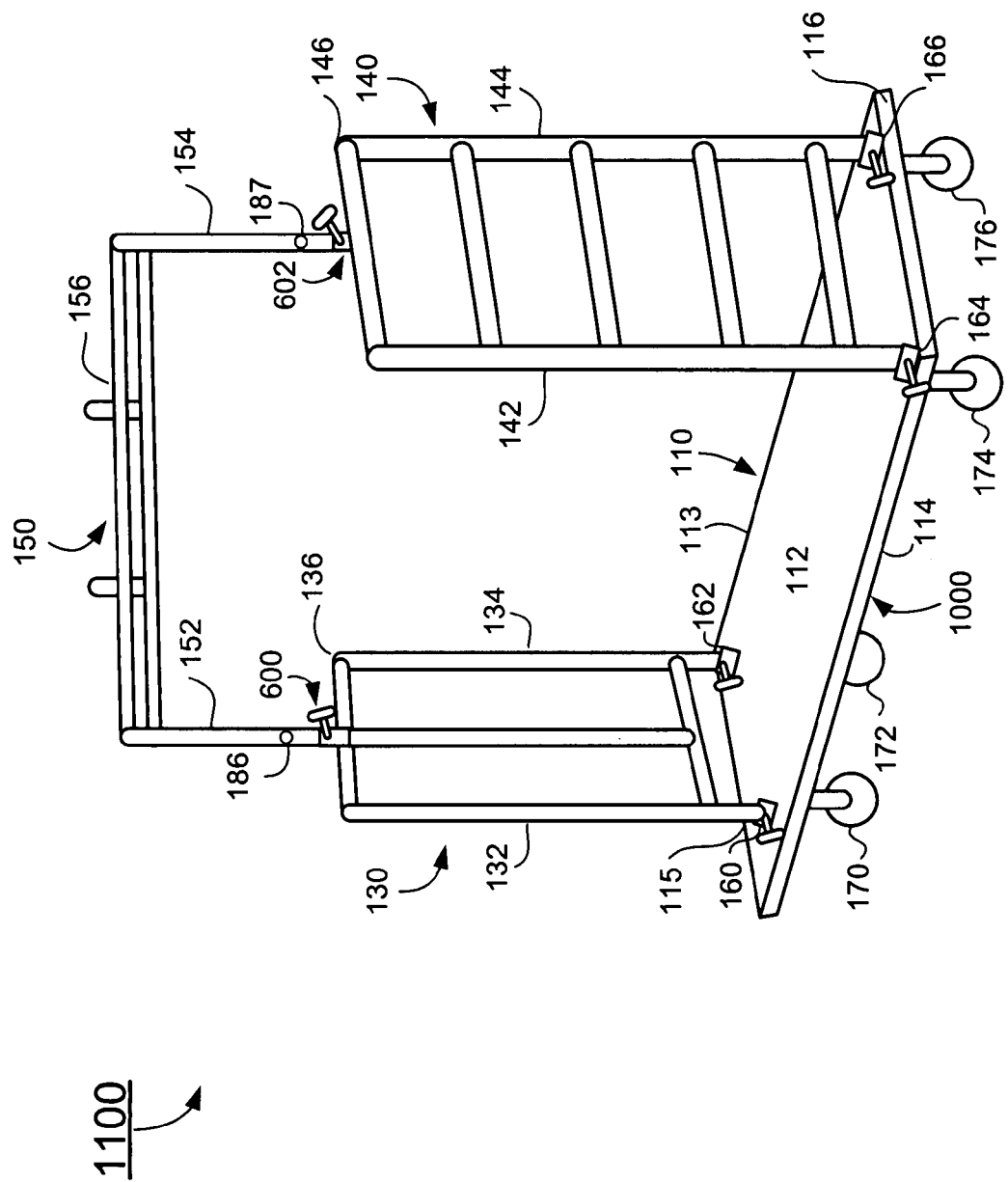
FIG. 1 is a perspective view of a convertible cart in accordance with one embodiment of the present invention.
Figure 4:
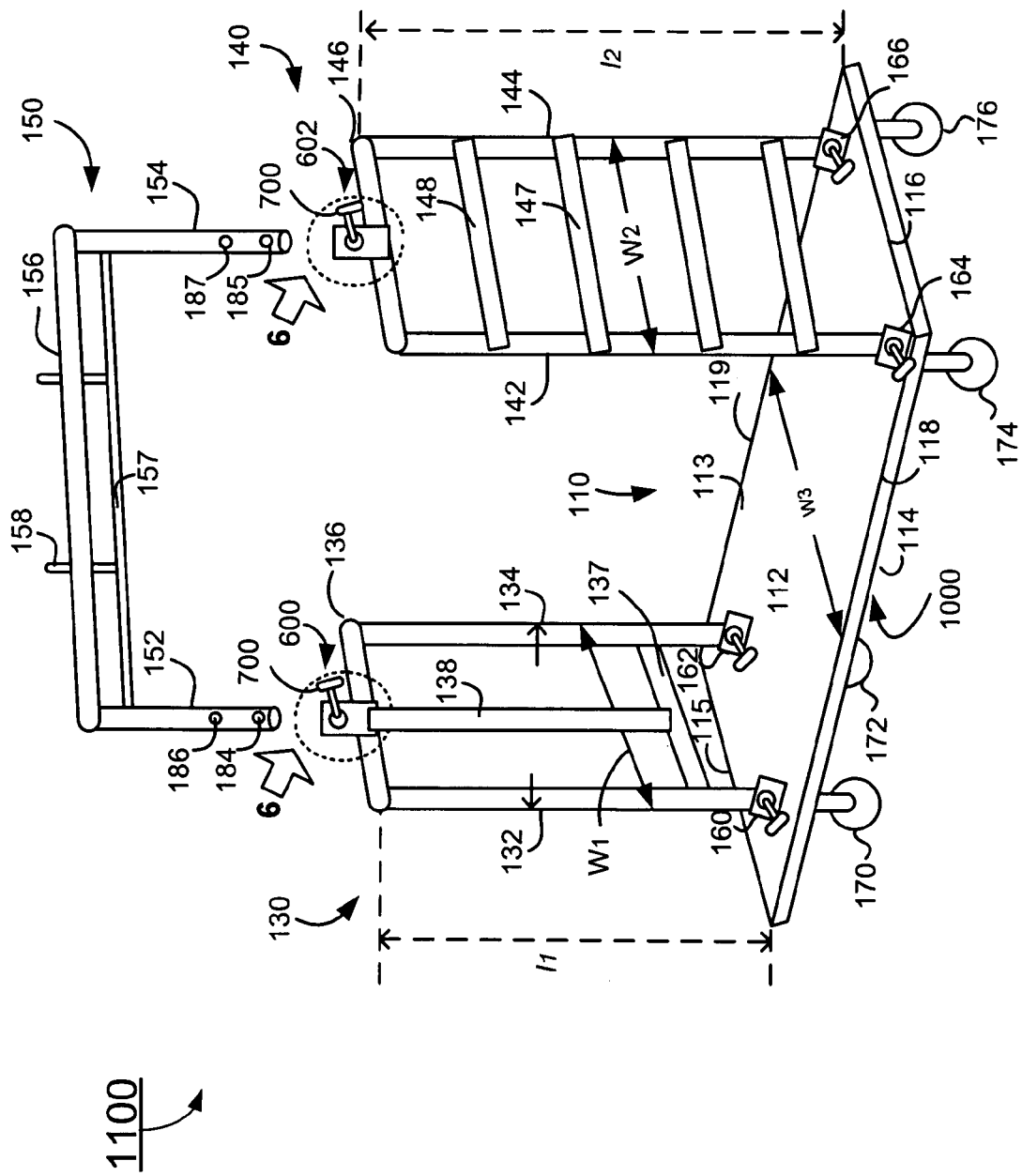
FIG. 4 is a perspective exploded view of a convertible cart according to one embodiment of the present invention.
Figure 5:
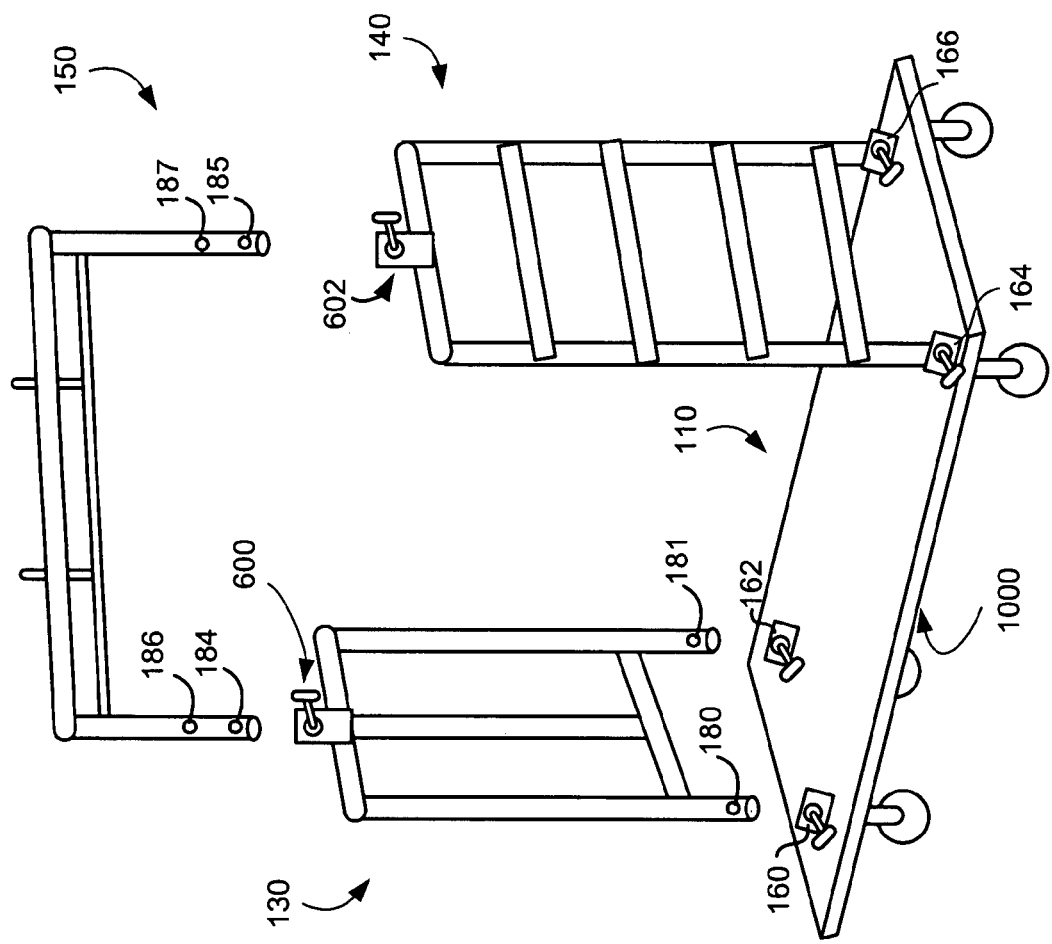
FIG. 5 is another perspective exploded view of a convertible cart according to one embodiment of the present invention.

Referring now to FIGS. 1, 4 and 5, a convertible cart 1100 is shown according to one embodiment of the present invention. The present invention, in one aspect, relates to a convertible cart 1100. In one embodiment, the convertible cart 1100 has (a) a base frame 1000, (b) a platform 110, (c) a first frame 130, (d) a second frame 140, (e) a third frame 150, (f) a plurality of first coupling connectors 160, 162, 164, and 166, (g) a pair of second coupling connectors 600 and 602, and (h) a plurality of wheels 170, 172, 174, and 176.

The base frame 1000 has a body portion 112 defined by a first end 115, an opposite, second end 116, a first side 118, and an opposite, second side 119. The body portion has a top surface 113 and a bottom surface 114 and a third width, $W_3$, defined by the distance between the first side 118 and the second side 119. The first frame 130 and the second frame 140 are detachably mounted on the base frame 1000.

The first frame 130 has a first support member 132, a second support member 134, and a top support member 136 connected to the first support member 132 and second support member 134 at its ends, respectively. The first support member 132 and the second support member 134 are substantially parallel to each other and define a first width, $W_1$. The first frame 130 is detachably coupled to the body portion 112 of the platform 110 adjacent to the first end 115. When the first frame 130 is at a vertical position, the first support member 132 and the second-support member 134 are substantially perpendicular to the body portion 112 and the top support member 136 is apart from the top surface 113 of the body portion 112 in a distance $l_1$. Optionally, the first frame 130 has one or more support members 137 and 138 to further enhance its strength.

The second frame 140 has a first support member 142, a second support member 144, and a top support member 146 connected to the first support member 142 and second support members 144 at its ends, respectively. The first support member 142 and the second support member 144 are substantially parallel to each other and define a second width, $W_2$. The second frame 140 is detachably coupled to the body portion 112 of the platform 110 adjacent to the second end 116. When the second frame 140 is at a vertical position, the first support member 142 and the second support member 144 are substantially perpendicular to the body portion 112 and the top support member 136 is apart from the top surface 113 of the body portion 112 in a distance 12. Optionally, the second frame 140 has one or more support members 147 and 148 to further enhance its strength.

The third frame 150 has a first support member 152, a second support member 154, and a top support member 156 connected to the first support member 152 and second support member 154 at its ends, respectively. The first support member 152 and the second support member 154 are substantially parallel to each other. The first support member 152 is detachably coupled to one of the first frame 130 and the second frame 140, and the second support member 154 is detachably coupled to the other one of the first frame 130 and the second frame 140, respectively. The top support member 156 of the third frame 150 is substantially perpendicular to the top support member 136 of the first frame 130 and the top support member 146 of the second frame 140. Optionally, the third frame 150 has one or more support members 157 and 158 to further enhance its strength.

This convertible cart 1100 provides several simple and efficient coupling connectors by which the user may assemble or disassemble the first, second and third frames to form a Bellman luggage cart, a platform cart, or dolly cart. The configuration of the convertible cart is compact, thereby limiting the overall space required or associated with the use and storage of the cart. Moreover, it can be made from light weight material to provide detachable frames, thereby providing an easy-to-reassemble and portable multi-purpose convertible cart.

The plurality of first coupling connectors 160, 162, 164 and 166 is configured to detachably engage a corresponding one of the first support member 132 and the second support member 134 of the first frame 130, and the first support member 142 and the second support member 144 of the second frame 140, respectively, with the platform 110.

The one of the pair of second coupling connectors 600 is configured to detachably engage the first support member 152 of the third frame 150 with the top support member 136 of the first frame 130. The other one of the pair of second coupling connectors 602 is configured to detachably engage the second support member 154 of the third frame 150 with the top support member 146 of the second frame 140, respectively.

The plurality of wheels 170, 172, 174, and 176 is operable and is mounted to the base frame 1000. In the embodiment shown in FIGS. 1, 4, and 5, the convertible cart 1100 has four wheels 170, 172, 174, and 176. In another embodiment, the convertible cart 1100 has at least three wheels.

In one embodiment, the third width $W_3$ of the platform 110 is greater than the second width $W_2$ of the second frame 140. The second width $W_2$ of the second frame 140 is greater than the first width $W_1$ of the first frame 130. The height $l_1$ of the first frame 130 and the height $l_2$ of the second frame 140 are about or substantially equal.

Figure 9:
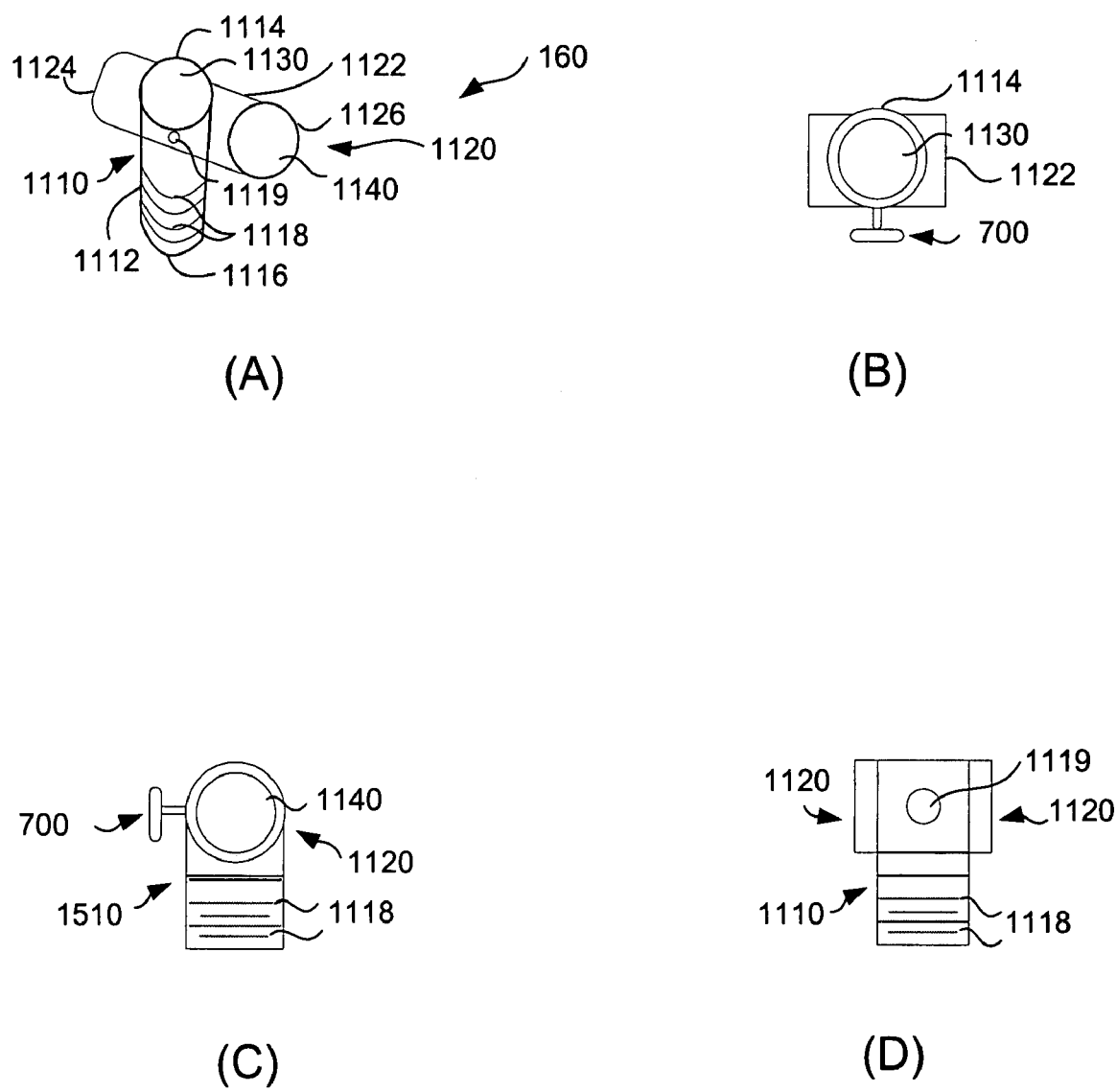
FIG. 9 shows a perspective view (A), a top view (B), a side view (C), and a front view of one of a plurality of first coupling connectors according to one embodiment of the present invention.

Referring now to FIG. 9, a perspective view (A), a top view (B), a side view (C), and a front view of one of a plurality of first coupling connector 160 are shown according to one embodiment of the present invention. In one embodiment, each of the plurality of first coupling connectors 160, 162, 164, 166 is a 2-way T connector. In another embodiment, each of the plurality of first coupling connectors 160, 162, 164, 166 is a 3-way T connector. Any combinations of these 2-way T connectors or 3-way T connectors are also possible. The first coupling connector 160, in the embodiment as shown in FIG. 9, is a 2-way T connector.

Each of the plurality of first coupling connectors 160, 162, 164 and 166 has a first shaft 1110 and a second shaft 1120 perpendicularly coupled to the first shaft 1110. The first shaft 1110 is configured to detachably engage a corresponding one of the first support member 132, and the second support member 134 of the first frame 130, the first support member 142, and the second support member 144 of the second frame 140, when the first frame 130 and the second frame 140 are in a vertical, erected position, respectively. The second shaft 1120 is configured to detachably engage a corresponding one of the first support member 132, and the second support member 134 of the first frame 130, the first support member 142, and the second support member 144 of the second frame 140, when the first frame 130 and the second frame 140 are in a horizontal, non-erected position, respectively.

The first shaft 1110 has at least a part of its body portion penetrated through the platform 110 and the base frame 1000. The body portion of the first shaft 1110 penetrated through the platform 110 has a helical groove or thread 1118 formed on surface of the first shaft 1110.

The first shaft 1110 has a first body portion 1112 defined by a first end 1114 and an opposite, second end 1116. The second shaft 1120 has a second body portion 1122 defined by a first end 1124 and a second, opposite end 1126. The first body portion 1112 has a first channel 1130 and the second body portion 1122 has a second channel 1140. These channels are formed at the center of the body portions so as to detachably engage a corresponding one of the first support member 132, and the second support member 134 of the first frame 130, the first support member 142, and the second support member 144 of the second frame 140, respectively.

Each of the first channel 1130 and the second channel 1140 extends from its first end to its second end of each of the corresponding first shaft 1110 and the second shaft 1120, respectively. As shown in FIG. 9C, the first shaft 1110 has a notch 1510 at which the penetration of the first coupling connector 160 stops.

Referring now to FIGS. 7, 8, and 9, in one embodiment, the first shaft 1110 also has an opening 1119 to insert a locking wing-nut 700, as shown in FIG. 7. In another embodiment, the first shaft 1110 has an opening 1119 to insert a locking pin 800, as shown in FIG. 8.

Referring now to FIG. 6, a top view (A) and a side view (B) of a second coupling connector 600 is shown according to one embodiment of the present invention. In one embodiment, each of the pair of second coupling connectors 600, 602 has a body portion 610 defined by a first end 620 and an opposite, second end 630. Each body portion 610 of the pair of second coupling connectors 600, 602 having a respective channel 640 configured to detachably engage a corresponding one of the first support member 152 and the second support member 154 of the third frame 150, respectively. In one embodiment, the first shaft 1110 also has an opening for receiving a locking wing-nut 700, as shown in FIG. 7. In another embodiment, the first shaft 1110 has an opening for receiving a locking pin 800, as shown in FIG. 8.

Referring back to FIGS. 4 and 5, a plurality of notches 180 (not shown in FIG. 4), 181 (not shown in FIG. 5), 182 (not shown in FIG. 5), 183 (not shown in FIG. 5), 184, 185, 186, and 187 are depicted. These notches are configured to be used in conjunction with the first coupling connectors 160, 162, 164, and 166, the second coupling connectors 600, and 602 to fasten the first support member 132, the second support member 134 of the first frame 130, the first support member 142, the second support member 144 of the second frame 140, and the first support member 152, the second support member 154 of the third frame 150. The notches 186 and 187 are configured for adjusting the height of the third support member 156.

Referring back to FIG. 1, the convertible cart 1100 is shown. The first frame 130 and the second frame 140 are erected from the base frame 1000. The third frame 150 is erected from the first frame 130 and the second frame 140 so as to form a luggage cart 1100.

Figure 2:
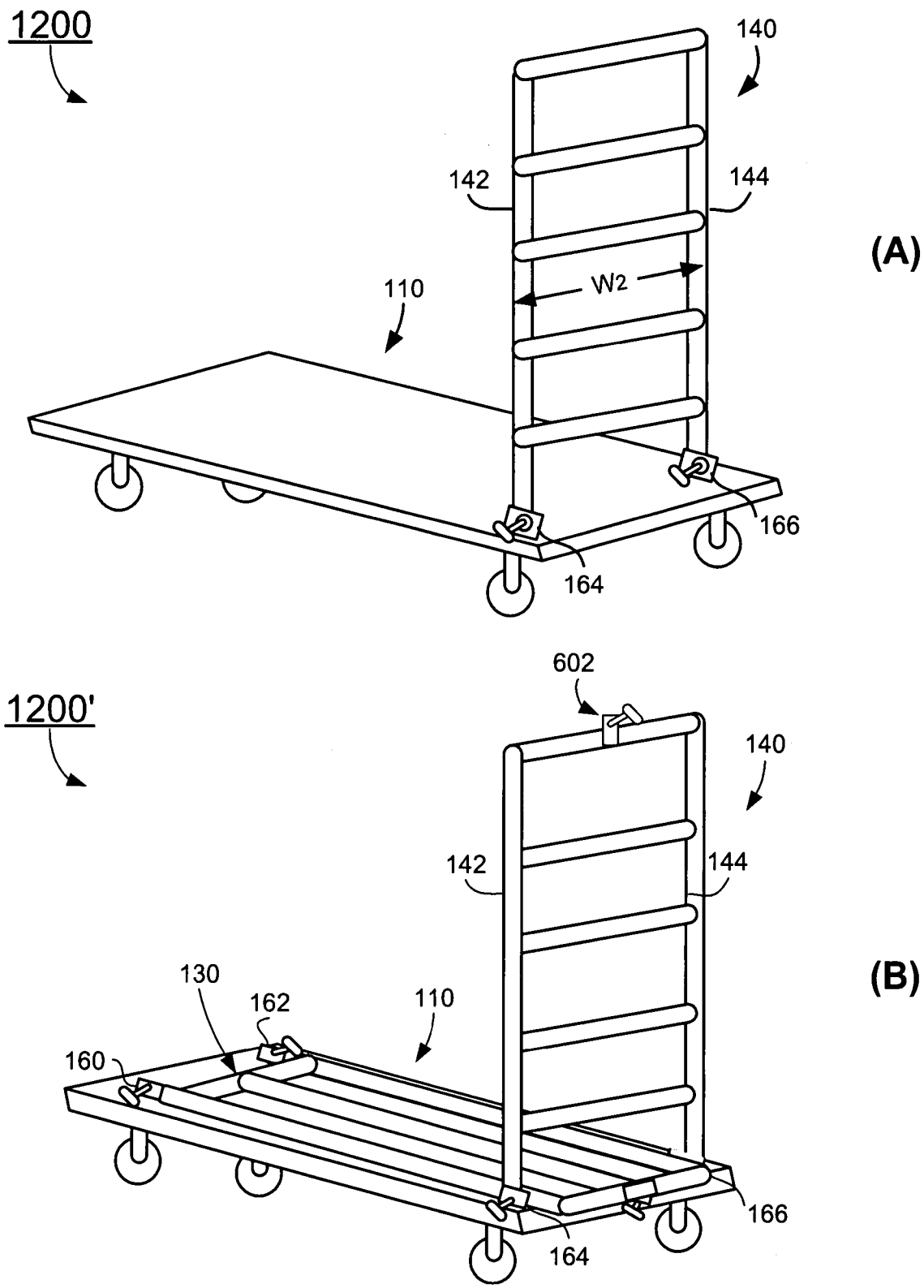
FIGS. 2A and 2B are perspective views of two platform carts according to embodiments of the present invention.

Referring now to FIG. 2, two perspective views of two platform carts 1200 and 1200' are shown according to embodiments of the present invention. In one embodiment, when the third frame 150 is detached from the pair of second coupling connectors 600, 602, and the first frame 130 is detached from the two of the plurality of first coupling connectors 160, 162, a platform cart 1200 is formed as shown in FIG. 2A. Here, the first support member 142 and the second support member 144 of the second frame 140 are engaged with two first coupling connectors 164 and 166 installed on the platform 110.

In another embodiment, when the third frame 150 is detached from the pair of second coupling connectors 600, 602, and the first frame 130 adapts a horizontal, non-erected position, another platform cart 1200' is formed, as shown in FIG. 2B. Here, the first support member 142 and the second support member 144 of the second frame 140 are engaged with two first coupling connectors 164 and 166 installed on the platform 110. The first support member 132 and the second support member 134 of the first frame 130 are engaged with the second shaft of two first coupling connectors 160 and 162 installed on the platform 110 so that the first frame 130 is in a horizontal, non-erected position.

Figure 3:
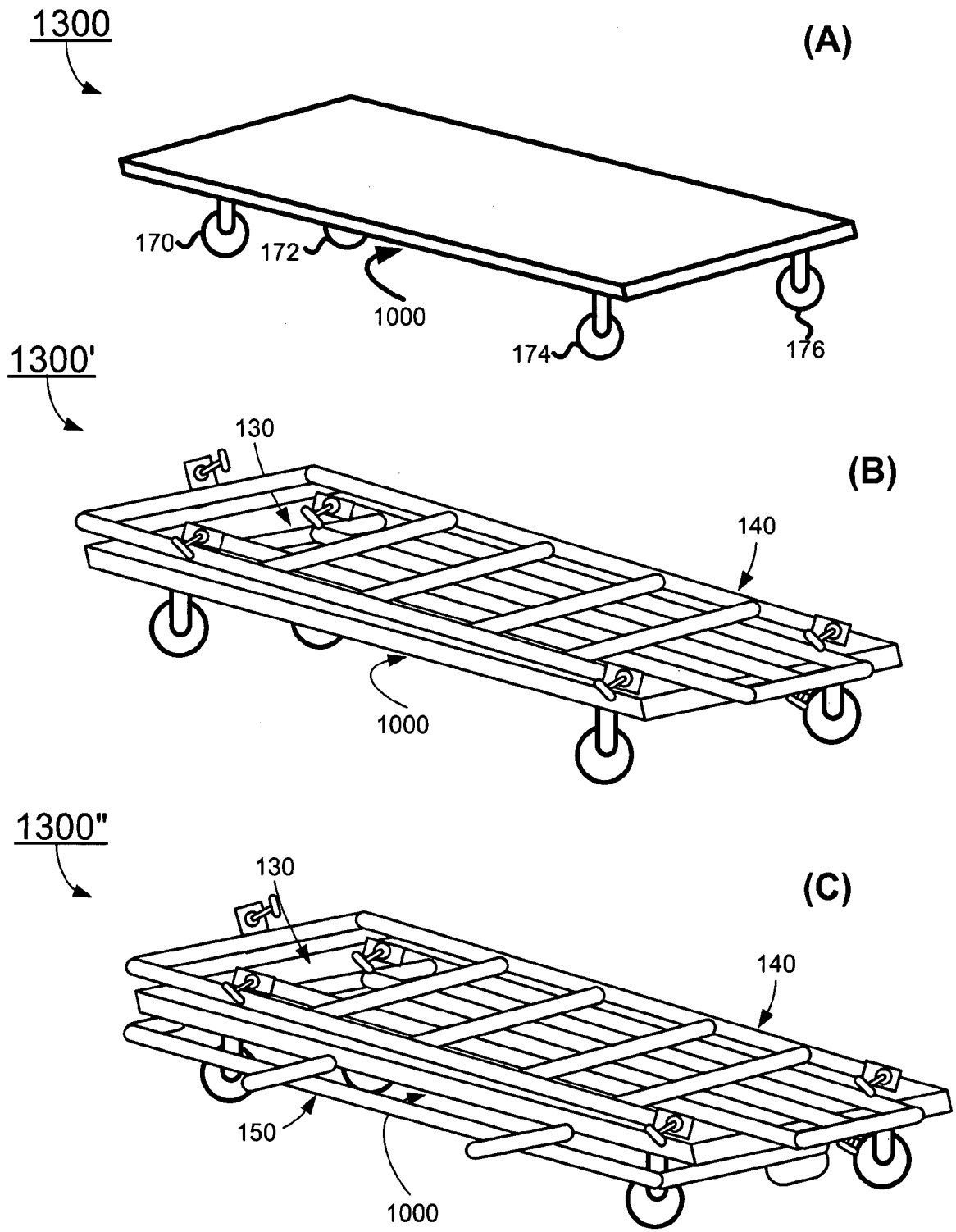
FIGS. 3A, 3B and 3C are perspective views of three dolly carts according to embodiments of the present invention.

Referring now to FIG. 3, three perspective views of three dolly carts 1300, 1300', and 1300" are respectively shown according to embodiments of the present invention.

In one embodiment, when the first frame 130, the second frame 140, the third frame 150, and the plurality of first coupling connectors 160, 162, 164, and 166 are removed, a dolly cart 1300 is formed. At least three wheels are needed for mobility and stability. In this embodiment, four wheels 170, 172, 174, and 176 are used.

In another embodiment, when the first frame 130 and the second frame 140 both adapt a horizontal, non-erected position and the third frame 150 is detached from the pair of second coupling connectors 600, 602, another dolly cart 1300' is formed. The first support member 132 and the second support member 134 of the first frame 130, the first support member 142 and the second support member 144 of the second frame 140, are engaged with the second shaft of the plurality of first coupling connectors installed on the base member 1000 so that the first frame 130 is in a horizontal, non-erected position.

In a further embodiment, when the first frame 130 and the second frame 140 both adapt a horizontal, non-erected position and the third frame 150 is detached from the pair of second coupling connectors 600, 602, yet another dolly cart 1300" is formed. The first support member 132 and the second support member 134 of the first frame 130, the first support member 142 and the second support member 144 of the second frame 140, are engaged with the second shaft of the plurality of first coupling connectors installed on the base member 1000 so that the first frame 130 and the second frame 140 are in a horizontal, non-erected position. The third frame 150 is stowed away under the base frame 1000.

Figure 10:
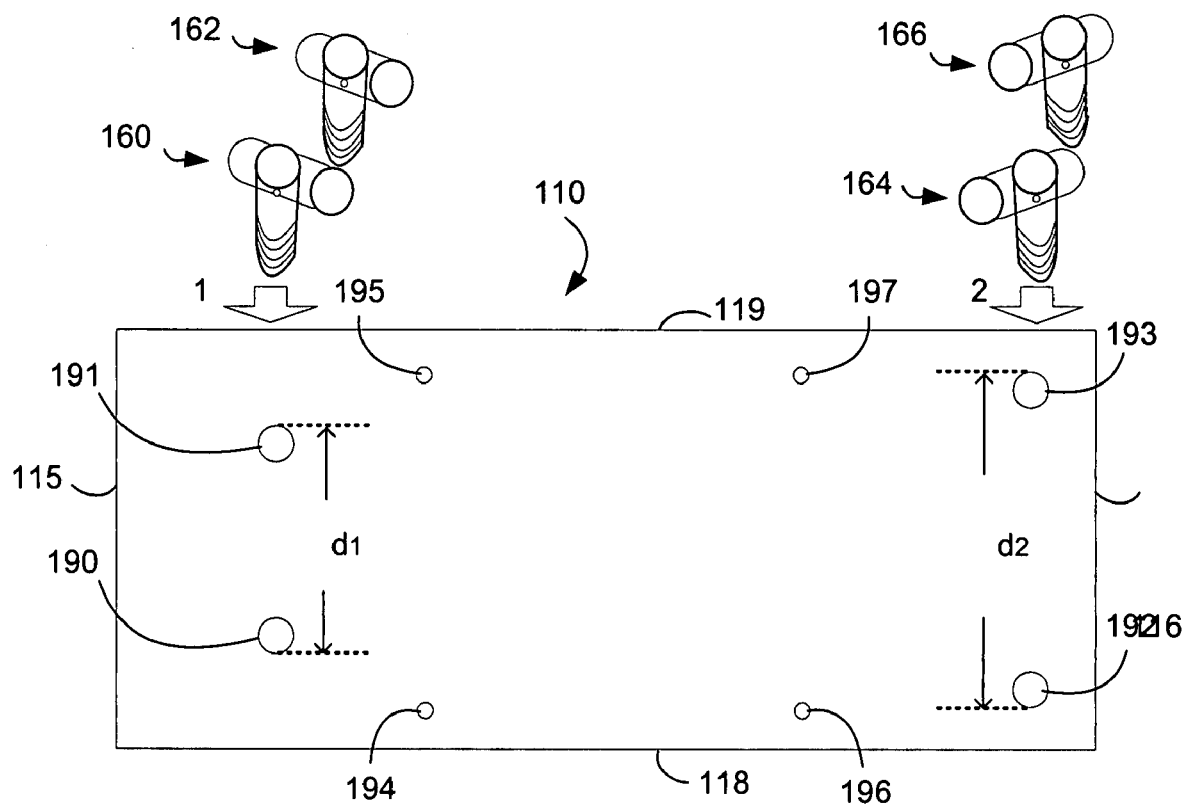
FIG. 10 is a top view of a platform showing the locations where a plurality of first coupling connectors shown in FIG. 9 is positioned according to one embodiment of the present invention.
Figure 11:
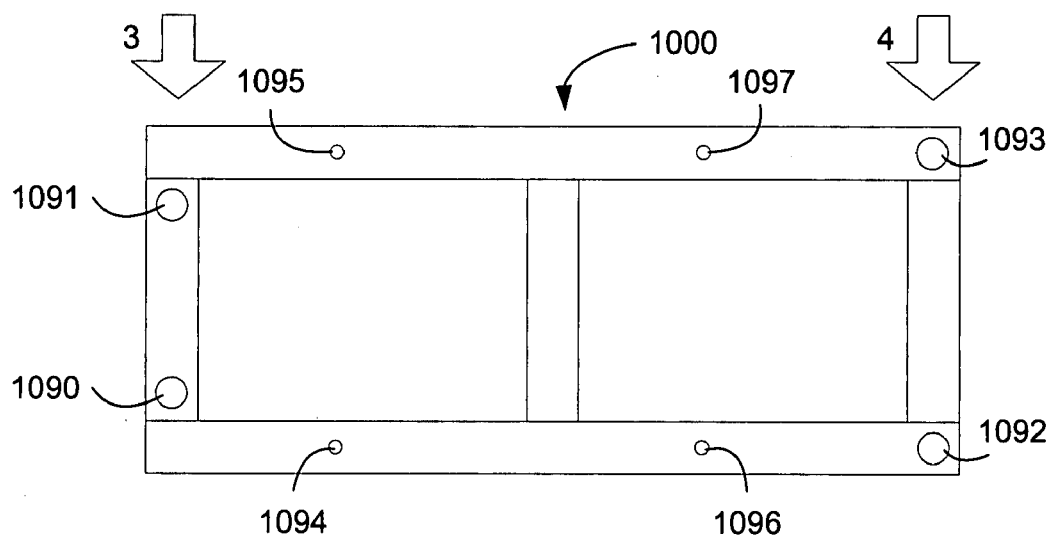
FIG. 11 is a bottom view of a platform according to one embodiment of the present invention.

Platform 110 and base frame 1000 will now be described in additional detail. With reference to FIGS. 10 and 11, platform 110 contains two pairs of first hole-like structures 190, 191, 192 and 193 (FIG. 10). One pair thereof is adjacent to the first end 115 and the other pair adjacent to the second end 116 of platform 110. The distance, $d_1$, between the pair adjacent to the first end 115 is smaller than the distance, $d_2$, between the pair adjacent to the second end 116. Each first hole-like structure 190, 191, 192 and 193 is configured to allow part of the body portion of the first shaft 1110 of the plurality of first coupling connectors 160, 162, 164, and 166 to enter therein. Likewise, the base frame 1000 contains two pairs of corresponding first hole-like structure counterparts 1090, 1091, 1092 and 1093 (FIG. 11).

Platform's first hole-like structures 190, 191, 192 and 193 and their base frame's first hole-like structure counterparts 190, 191, 192 and 193 allow corresponding first coupling connectors 160, 162, 164, 166 to engage platform 110 with base frame 1000, as depicted by white arrow 1-4 in FIGS. 10 and 11.

Optionally, platform 110 may contain two pairs of second hole-like structures 194, 195, 196 and 197. One pair thereof is adjacent to the first side 118 and the other pair adjacent to the second side 119 of platform 110. Likewise, base frame 1000 contains two pairs of corresponding second hole-like structure counterparts 1094, 1095, 1096 and 1097. These second hole-like structures and their counterparts are each configured to permit a connector, e.g., a screw or bolt, to further engage platform 110 with base frame 1000. One skilled in the art may appreciate that any other means, structures or configurations that can perform the functions described herein may also be used.

Platform 110 and frames including base frame 1000 of the present invention may be comprised of metallic material, alloy, or other materials that are capable of functioning as described herein. Support members of the first frame 130, the second frame 140, and the third frame 150 are preferably tubular to provide adequate rigidity at minimum weight. Round tubular aluminum tubing is preferable.

Referring now to FIG. 12, a side view of a platform with a plurality of first coupling connectors in place (A), a pair of nuts 1410 and 1420 for fastening the plurality of first coupling connectors (B), and a side view of the platform with the plurality of first coupling connectors installed (C) are shown according to one embodiment of the present invention.

The plurality of first coupling connectors 160, 162, 164, and 166 is configured to penetrate the base frame 1000 and the platform 110. As shown in FIG. 12A, the first coupling connectors 160 and 164 are installed in corresponding first hole-like structures, and the first coupling connectors 162 and 166 are not shown in this view. The pair of nuts 1410 and 1420 is shown to have an octagon shape. Other shapes such as hexagon, square are also usable in this application.

FIG. 12C illustrates a side view of the convertible cart with the plurality of first coupling connectors 160, 162, 164, 166 installed with nuts 1410 and 1420.

Figure 13:
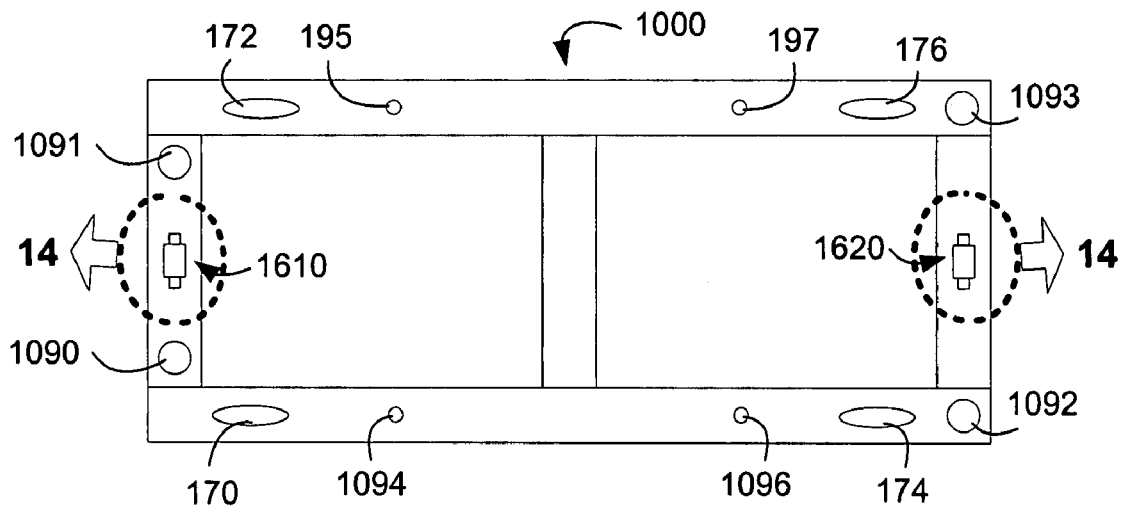
FIG. 13 shows a bottom view of a platform with a pair of third coupling connectors installed according to one embodiment of the present invention.
Figure 14:
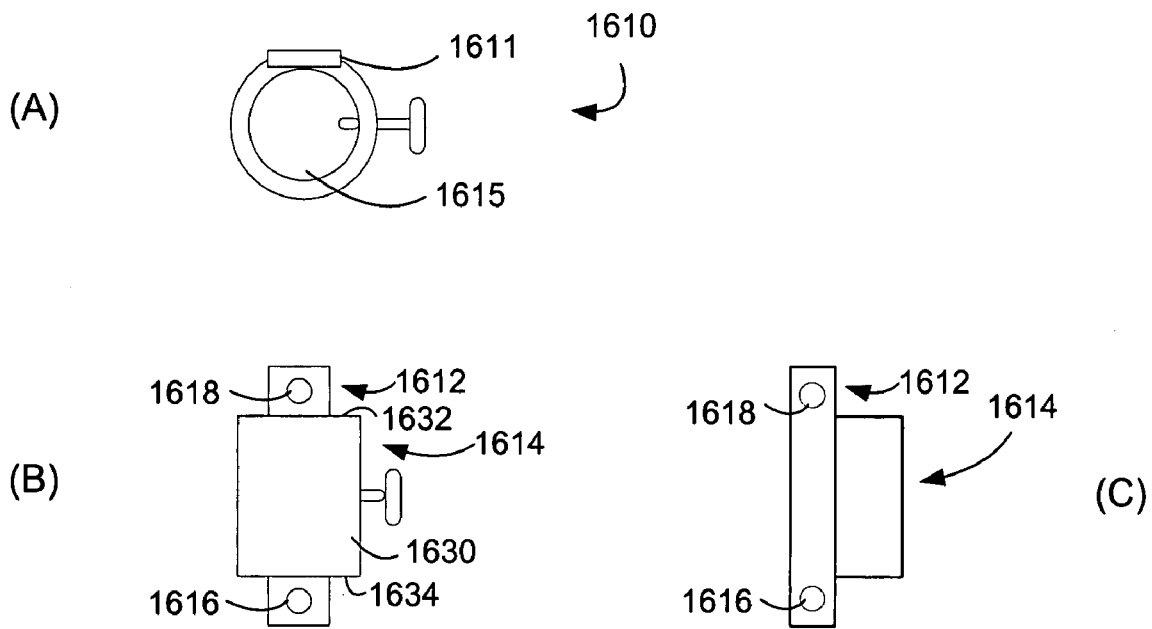
FIG. 14 shows a side view (A), a top view (B) and another side view (C) of a third coupling connector as shown in FIG. 13 according to one embodiment of the present invention.
Figure 15:
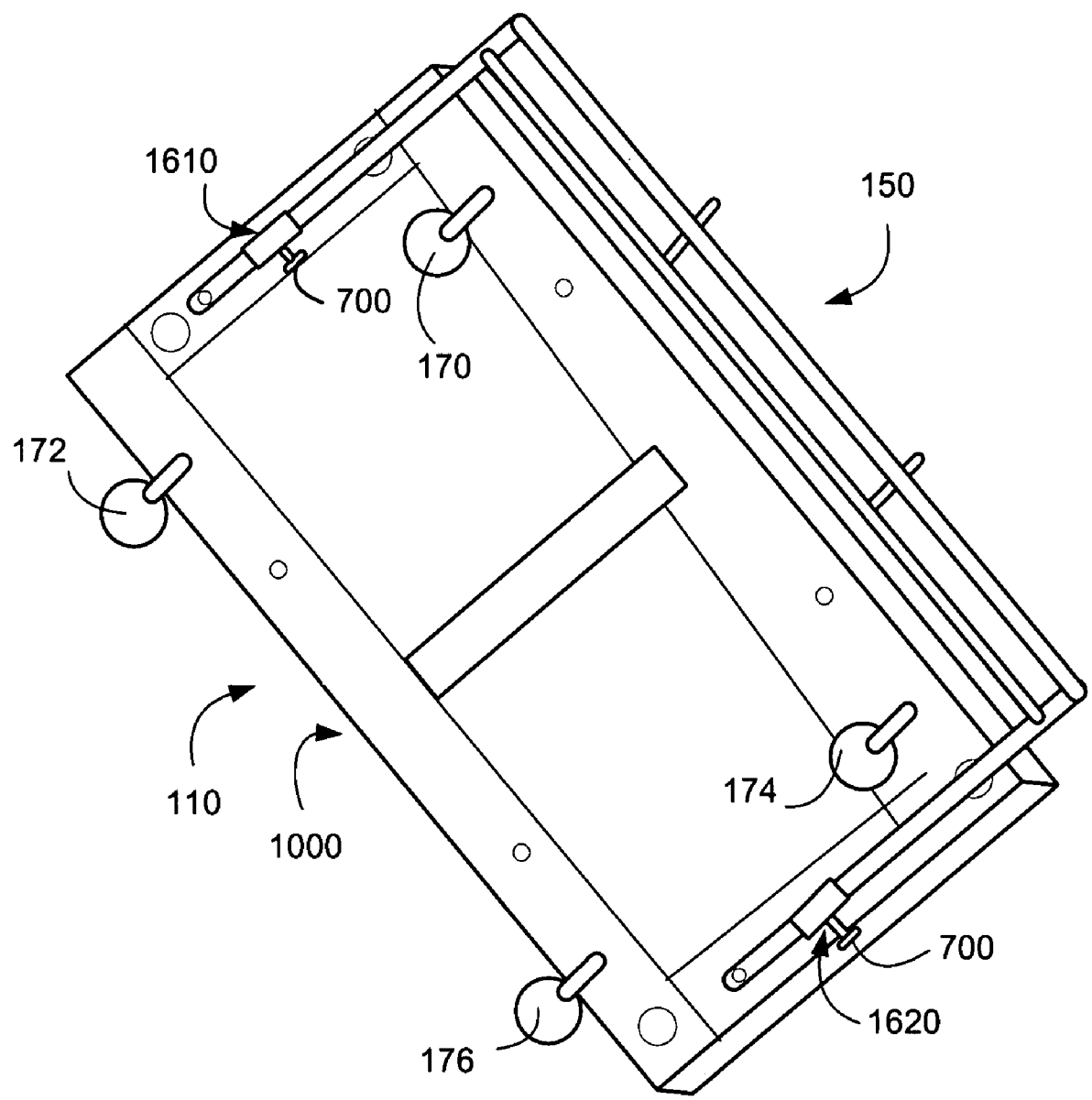
FIG. 15 illustrates a perspective view of the third frame engaged with the base frame through the pair of third coupling connectors for storage according to one embodiment of the present invention.

Third coupling connectors 1610 and 1620 will now be described in additional details. With reference to FIGS. 13, 14, and 15, a pair of third coupling connectors 1610 and 1620 may be mounted underneath the base frame 1000, as depicted at arrow No. 14 in FIG. 13. Each of the pair of third coupling connectors 1610, 1620 is configured to detachably engage a corresponding one of the first support member 152 and second support member 154 of the third frame 150, respectively (FIG. 15). Each of the pair of third coupling connectors 1610, 1620 extends substantially parallel to and spaced apart from the other third coupling connector 1620, 1610 at a distance that is substantially the same as that between the first support member 152 and second support member 154 of the third frame 150 (best shown in FIG. 15).

Each of the pair of third coupling connectors 1610, 1620 has a first panel 1612 mounted on the base frame 1000, and a tubular member 1614 mounted onto the first panel 1612 (FIG. 14). Each tubular member 1614 of the pair of third coupling connectors 1610, 1620 is configured to detachably engage a corresponding one of the first support member 152 and the second support member 154 of the third frame 150, respectively, so that the third frame 150 is held therein in a storage position (also shown in FIGS. 3C and 15). Each tubular member 1614 of the pair of third coupling connectors 1610, 1620 has a body portion 1630 defined by a first end 1632 and an opposite, second end 1634.

In one embodiment, the body portion 1630 of each tubular member 1614 of the pair of third coupling connectors 1610, 1620 has a respective channel 1615 configured to detachably engage the corresponding one of the first support member 152 and the second support member 154 of the third frame 150, respectively, so that third frame 150 is disposed therein for storage (FIGS. 3C and 15).

In another embodiment, the channel 1615 in the body portion 1630 of the tubular member 1614 of the pair of third coupling connectors 1610, 1620 extends from end 1632 to end 1634 of the tubular member 1614. The first panel 1612 of each third coupling connector 1610 may be mounted to base frame 1000 by at least a screw through openings or holes 1618 and/or 1616 on the first panel 1612 (FIG. 14C). One skilled in the art may appreciate that any other means, structures or configurations that can perform the functions described herein may also be used.

The first, second and third coupling connectors of the present invention may be comprised of metallic material, aluminum, alloy, tough rugged material, or other materials that are capable of functioning as described herein.

The use of a locking wing-nut 700, as shown in FIG. 7, or a locking pin 800, as shown in FIG. 8, in conjunction with first, second and third coupling connectors 160, 162, 164, 166, 600, 602, 1610 and 1620, and the first frame 130, the second frame 140 and the third frame 150 will now be described in additional detail. A locking wing-nut 700, or a locking pin 800 serves the function of locking corresponding one of the first support member 132 and the second support member 134 of the first frame 130, the first support member 142 and the second support member 144 of the second frame 140, the first support member 152 and the second support member 154 of the third frame 150, respectively.

FIG. 15 illustrates a perspective bottom view of a third frame 150 engaged with the base frame 1000 through a pair of third coupling connectors 1610 and 1620 for storage. The pair of third coupling connectors 1610 and 1620 is mounted on the base frame 1000 on the sides. A locking wing-nut 700 (shown) or a locking pin 800 (not shown) is used to fasten the third frame 150 to the pair of third coupling connectors 1610 and 1620. The plurality of wheels 170, 172, 174, and 176 are also mounted on the base frame 1000. In one embodiment, two of the plurality of wheels 170, 172, 174, and 176 are swivel wheels and other two of the plurality of wheels 170, 172, 174, and 176 are fixed wheels. In another embodiment, the plurality of wheels 170, 172, 174, and 176 is swivel wheels to increase mobility and maneuverability of the convertible cart.

In one embodiment, the first support member 132, the second support member 134, and the top support member 136 of the first frame 130 form an integral frame. The first support member 142, the second support member 144, and the top support member 146 of the second frame 140 form an integral frame. The first support member 152, the second support member 154, and the top support member 156 of the third frame 150 form an integral frame.

In another aspect, the present invention relates to a convertible cart 1100. In one embodiment, the convertible cart 1100 has (a) a platform 110, (b) a first frame 130, (c) a second frame 140, (d) a third frame 150, (e) a plurality of first coupling connectors 160, 162, 164, 166, (f) a pair of second coupling connectors 600, 602, and (g) a plurality of wheels 170, 172, 174, 176.

In one embodiment, the base frame 1000 has a body portion 112 with a third width, $W_3$. The first frame 130 has a first support member 132, a second support member 134, and a top support member 136 connected to the first and second support members 132/134 at its ends, respectively. The first support member 132 and the second support member 134 are substantially parallel to each other and define a first width, $W_1$ The first frame 130 is detachably coupled to the body portion 112 of the platform 110 adjacent to the first end 115.

The second frame 140 has a first support member 142, a second support member 144, and a top support member 146 connected to the first support member 142 and second support members 144 at its ends, respectively. The first support member 142 and the second support member 144 are substantially parallel to each other and define a second width, $W_2$. The second frame 140 is detachably coupled to the body portion 112 of the platform 110.

The plurality of first coupling connectors 160, 162, 164 and 166 are configured to detachably engage a corresponding one of the first support member 132 and the second support member 134 of the first frame 130, and the first support member 142 and the second support member 144 of the second frame 140, respectively, with the platform 110.

The third frame 150 has a first support member 152, a second support member 154, and a top support member 156 connected to the first and second support members 152/154 at its ends, respectively. The first support member 152 and the second support member 154 are substantially parallel to each other. The first support member 152 is detachably coupled to one of the first frame 130 and the second frame 140, and the second support member 154 is detachably coupled to the other one of the first frame 130 and the second frame 140, respectively.

The one of the pair of second coupling connectors 600 is configured to detachably engage the first support member 152 of the third frame 150 with the top support member 136 of the first frame 130. The other one of the pair of second coupling connectors 602 is configured to detachably engage the second support member 154 of the third frame 150 with the top support member 146 of the second frame 140, respectively.

The plurality of wheels 170, 172, 174, and 176 is operable and is mounted to the base frame 1000. In one embodiment, the convertible cart 1100 has at least three wheels. In one embodiment, the width $W_3$ of the platform 110 is greater than the width $W_2$ of the second frame 140. The width $W_2$ of the second frame 140 is greater than the width $W_1$ of the first frame 130.

In one embodiment, each of the plurality of first coupling connectors 160, 162, 164, 166 is a 2-way T connector, a 3-way T connector, or any combinations of these connectors. Each of the plurality of first coupling connectors 160, 162, 164, 166 has a first shaft 1110 and a second shaft 1120 perpendicularly coupled to the first shaft 1110. The first shaft 1110 is configured to detachably engage a corresponding one of the first support member 132, and the second support member 134 of the first frame 130, the first support member 142, and the second support member 144 of the second frame 140, when the first frame 130 and the second frame 140 are in a vertical, erected position, respectively. The second shaft 1120 is configured to detachably engage a corresponding one of the first support member 132, and the second support member 134 of the first frame 130, the first support member 142, and the second support member 144 of the second frame 140, when the first frame 130 and the second frame 140 are in a horizontal, non-erected position, respectively.

The first shaft 1110 has as least a part of its body portion penetrated through the platform 110 and the base frame 1000. The body portion of the first shaft 1110 penetrated through the platform 110 has a helical groove or thread 1118 formed on surface of the first shaft 1110.

The first shaft 1110 has a first body portion 1112 defined by a first end 1114 and an opposite, second end 1116. The second shaft 1120 has a second body portion 1122 defined by a first end 1124 and a second, opposite end 1126. The first body portion 1112 has a first channel 1130 and the second body portion 1122 has a second channel 1140. These channels are formed at the center of the body portions so as to detachably engage a corresponding one of the first support member 132, and the second support member 134 of the first frame 130, the first support member 142, and the second support member 144 of the second frame 140, respectively.

Each of the first channel 1130 and the second channel 1140 extends from its first end to its second end of each of the corresponding first shaft 1110 and the second shaft 1120, respectively.

In one embodiment, each of the pair of second coupling connectors 600, 602 has a body portion 610 defined by a first end 620 and an opposite, second end 630. Each body portion 610 of the pair of second coupling connectors 600, 602 having a respective channel 640 configured to detachably engage a corresponding one of the first support member 152 and the second support member 154 of the third frame 150, respectively.

The first frame 130 and the second frame 140 are erected from the base frame 1000. The third frame 150 is erected from the first frame 130 and the second frame 140 so as to form a luggage cart 1100.

In one embodiment, when the third frame 150 is detached from the pair of second coupling connectors 600, 602, and the first frame 130 is detached from the two of the plurality of first coupling connectors 160, 162, a platform cart 1200 is formed. In another embodiment, when the third frame 150 is detached from the pair of second coupling connectors 600, 602, and the first frame 130 adapts a horizontal, non-erected position, another platform cart 1200' is formed.

In one embodiment, when the first frame 130, the second frame 140 and the third frame 150 are all removed, a dolly cart 1300 is formed. In another embodiment, when the first frame 130 and the second frame 140 both adapt a horizontal, non-erected position and the third frame 150 is detached from the pair of second coupling connectors 600, 602, another dolly cart 1300' is formed. In a further embodiment, when the first frame 130 and the second frame 140 both adapt a horizontal, non-erected position and the third frame 150 is stowed away under the base frame 1000, yet another dolly cart 1300" is formed.

In one embodiment, each of the plurality of first coupling connectors 160, 162, 164, 166 is held in place by a corresponding nut 1410.

In one embodiment, the first support member 132, the second support member 134, and the top support member 136 of the first frame 130 form an integral frame. The first support member 142, the second support member 144, and the top support member 146 of the second frame 140 form an integral frame. The first support member 152, the second support member 154, and the top support member 156 of the third frame 150 form an integral frame.

In yet another aspect, the present invention relates to yet another convertible cart 1100. In one embodiment, the convertible cart 1100 has (a) a platform 110 with a third width, $W_3$, (b) a first frame 130 with a width $W_1$, and detachably coupled to the platform 110, (c) a second frame 140 with a second width, $W_2$, and detachably coupled to the platform 110 at a position apart from where the first frame 130 is detachably coupled to the platform 110, (d) a plurality of first coupling connectors 160, 162, 164, 166 configured to detachably engage the first frame 130 and the second frame 140, respectively, with the platform 110, (e) a third frame 150 having two ends detachably coupled to the first frame 130 and the second frame 140, respectively, (f) a pair of second coupling connectors 600, 602 detachably engage the third frame 150 with the first frame 130 and the second frame 140, respectively, and (g) a plurality of wheels 170, 172, 174, 176 operable mounted to the platform 110. In one embodiment, the width $W_3$ of the platform 110 is greater than the width $W_2$ of the second frame 140. The width $W_2$ of the second frame 140 is greater than the width $W_1$ of the first frame 130.

In one embodiment, each of the plurality of first coupling connectors 160, 162, 164, 166 is a 2-way T connector, a 3-way T connector, or any combinations of these connectors. The plurality of first coupling connectors 160, 162, 164, 166 has a first shaft 1110 and a second shaft 1120 perpendicularly connected to the first shaft 1110. The first shaft 1110 is configured to detachably engage a corresponding one of the first frame 130 and the second frame 140 when both frames are in a vertical, erected position, respectively. The second shaft 1120 is configured to detachably engage a corresponding one of the first frame 130 and second frame 140 when both frames are in a horizontal, non-erected position, respectively.

In one embodiment, the first shaft 1110 of plurality of first coupling connectors 160, 162, 164, 166 has at least a part of its body portion penetrate through the platform 110. The body portion of the first shaft 1110 of the plurality of first coupling connectors 160, 162, 164, 166 penetrating through the platform 110 has a helical groove or a thread 1118 formed on surface of the first shaft 1110.

The first shaft 1110 of the plurality of first coupling connectors 160, 162, 164, 166 has a body portion 1112 defined by a first end 1114 and an opposite, second end 1116. The second shaft 1120 of the plurality of first coupling connectors 160, 162, 164, 166 has a body portion 1122 defined by a first side 1124 and a second, opposite side 1126. Each body portion of the first shaft 1112 and the second shaft 1122 has a respective channel 1130, 1140 formed at the center so as to detachably engage a corresponding one of the first frame 130 and the second frame 140, respectively.

Each channel 1130, 1140 of the first shaft 1112 and the second shaft 1122 extends from the first end to the second end of each body portion of corresponding first shaft 1110 and second shaft 1120 of the plurality of first coupling connectors 160, 162, 164, 166, respectively.

In one embodiment, the pair of second coupling connectors 600, 602 has a body portion 610 defined by a first end 620 and an opposite, second end 630. Each body portion 610 of the pair of second coupling connectors 600, 602 has a respective channel 640 configured to detachably couple the third frame 150 to the first frame 130 and the second frame 140, respectively.

When the first frame 130, the second frame 140, and third frame 150 are erected, a luggage cart 1100 is formed.

When the first frame 130 is detached from two of the plurality of first coupling connectors 160, 162, 164, 166 and the third frame 150 is detached from the pair of second coupling connectors 600, 602, a platform cart 1200 is formed.

When the first frame 130 adapts a horizontal, non-erected position and the third frame 150 is detached from the pair of second coupling connectors 600, 602, a platform cart 1200' is formed.

When the first frame 130 and the second frame 140 both adapt a horizontal, non-erected position and the third frame 150 is detached from the pair of second coupling connectors 600, 602, a dolly cart 1300 is formed.

In one embodiment, each of the plurality of first coupling connectors 160, 162, 164, 166 is held in place by a corresponding nut 1410.

In summary, the present invention, among other things, provides a multi-purpose convertible cart that is compact, easy to operate, flexible, user-friendly and versatile, allows a user to configure into a Bellman cart, a platform cart, or a dolly cart, and can be used in many places including stores, offices or homes, especially in places where space is limited.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A convertible cart comprising:
    a. a base frame;
    b. a platform having a body portion defined by a first end, an opposite, second end, a first side and an opposite, second side, wherein the body portion has a top surface and a bottom surface and a width, $W_3$, defined by the first side and the second side, and is detachably mounted on the base frame;
    c. a first frame having a first support member, a second support member, and a top support member connected to the first and second support members at its ends, respectively, such that the first support member and the second support member are substantially parallel to each other and define a width, $W_1$, there between, wherein the first frame is detachably coupled to the body portion of the platform adjacent to the first end thereof such that when the first frame is at a vertical position, the first support member and the second support member are substantially perpendicular to the body portion and the top support member is apart from the top surface of the body portion in a distance $l_1$;
    d. a second frame having a first support member, a second support member, and a top support member connected to the first and second support members at its ends, respectively, such that the first support member and the second support member are substantially parallel to each other and define a width, $W_2$ there between, wherein the second frame is detachably coupled to the body portion of the platform adjacent to the second end thereof such that when the second frame is at a vertical position, the first support member and the second support member are substantially perpendicular to the body portion and the top support member is apart from the top surface of the body portion in a distance $l_2$;
    e. a plurality of first coupling connectors each configured to detachably engage a corresponding one of the first support member and the second support member of the first frame, and the first support member and the second support member of the second frame, respectively, with the platform;
    f. a third frame having a first support member, a second support member, and a top support member connected to the first and second support members at its ends, respectively, such that the first support member and the second support member are substantially parallel to each other, wherein the first support member is detachably coupled to the first frame, and the second support member is detachably coupled to the second frame, respectively, such that the top support member of the third frame is substantially perpendicular to the top support member of the first frame and the top support member of the second frame;
    g. a pair of second coupling connectors, wherein one of the pair of second coupling connectors is configured to detachably engage the first support member of the third frame with the top support member of the first frame, and the other of the pair of second coupling connectors is configured to detachably engage the second support member of the third frame with the top support member of the second frame, respectively; and
    h. a plurality of wheels operable mounted to the base frame, wherein $W_3 > W_2 > W_1$ and $l_1$ and $l_2$ are substantially equal,
    wherein each of the plurality of first coupling connectors comprises a 2-way T connector, a 3-way T connector, or any combinations thereof,
    wherein each of the plurality of first coupling connectors comprises a first shaft and a second shaft perpendicularly coupled to the first shaft, and wherein the first shaft is configured to detachably engage a corresponding one of the first and second support members of the first frame and second frame that are in a vertical, erected position, respectively, and the second shaft is configured to detachably engage a corresponding one of the first and second support members of the first and second frames, that are in a horizontal, non-erected position, respectively,
    wherein the first shaft has at least a part of its body portion penetrated through the platform and the base frame, and
    wherein the body portion of the first shaft penetrated through the platform comprises a helical groove or thread formed on a surface thereof.

2. A convertible cart comprising:
    a. a base frame;
    b. a platform having a body portion defined by a first end, an opposite, second end, a first side and an opposite, second side, wherein the body portion has a top surface and a bottom surface and a width, $W_3$, defined by the first side and the second side, and is detachably mounted on the base frame;
    c. a first frame having a first support member, a second support member, and a top support member connected to the first and second support members at its ends, respectively, such that the first support member and the second support member are substantially parallel to each other and define a width, $W_1$, there between, wherein the first frame is detachably coupled to the body portion of the platform adjacent to the first end thereof such that when the first frame is at a vertical position, the first support member and the second support member are substantially perpendicular to the body portion and the top support member is apart from the top surface of the body portion in a distance $l_1$;

d. a second frame having a first support member, a second support member, and a top support member connected to the first and second support members at its ends, respectively, such that the first support member and the second support member are substantially parallel to each other and define a width, $W_2$ there between, wherein the second frame is detachably coupled to the body portion of the platform adjacent to the second end thereof such that when the second frame is at a vertical position, the first support member and the second support member are substantially perpendicular to the body portion and the top support member is apart from the top surface of the body portion in a distance $l_2$;

e. a plurality of first coupling connectors each configured to detachably engage a corresponding one of the first support member and the second support member of the first frame, and the first support member and the second support member of the second frame, respectively, with the platform;

f. a third frame having a first support member, a second support member, and a top support member connected to the first and second support members at its ends, respectively, such that the first support member and the second support member are substantially parallel to each other, wherein the first support member is detachably coupled to the first frame, and the second support member is detachably coupled to the second frame, respectively, such that the top support member of the third frame is substantially perpendicular to the top support member of the first frame and the top support member of the second frame;

g. a pair of second coupling connectors, wherein one of the pair of second coupling connectors is configured to detachably engage the first support member of the third frame with the top support member of the first frame, and the other of the pair of second coupling connectors is configured to detachably engage the second support member of the third frame with the top support member of the second frame, respectively; and h. a plurality of wheels operable mounted to the base frame, wherein $W_3>W_2>W_1$ and $l_1$ and $l_2$ are substantially equal, wherein each of the plurality of first coupling connectors comprises a 2-way T connector, a 3-way T connector, or any combinations thereof, wherein each of the plurality of first coupling connectors comprises a first shaft and a second shaft perpendicularly coupled to the first shaft, and wherein the first shaft is configured to detachably engage a corresponding one of the first and second support members of the first frame and second frame that are in a vertical, erected position, respectively, and the second shaft is configured to detachably engage a corresponding one of the first and second support members of the first and second frames, that are in a horizontal, non-erected position, respectively, and wherein the first shaft of each of the plurality of first coupling connectors comprises a first body portion defined by a first end and an opposite, second end, and the second shaft comprises a second body portion defined by a first side and a second, opposite side, each of the first body portion and the second body portion having a first channel and a second channel, formed at the center thereof so as to detachably engage a corresponding one of the first and second support members of the first frame and the second frame, respectively.

3. The convertible cart of claim 2, wherein the first channel extends from its first end to its second end of the first shaft, and the second channel extends from its first side to its second side of each of the second shafts.

4. The convertible cart of claim 2, wherein each of the pair of second coupling connectors comprises a body portion defined by a first end and an opposite, second end, each body portion of the pair of second coupling connectors, having a respective channel configured to detachably engage a corresponding one of the first support member and second support member of the third frame, respectively.

5. The convertible cart of claim 2, wherein the first frame and the second frame are erectable to corresponding vertical positions from the base frame, and the third frame is erectable to a corresponding vertical position from the first frame and the second frame so as to form a luggage cart.

6. The convertible cart of claim 2, wherein each of the plurality of first coupling connectors is held in place by a corresponding nut.

7. The convertible cart of claim 2, wherein the first, second, and top support members of the first frame form an integral frame.

8. The convertible cart of claim 2, wherein the first, second, and top support members of the second frame form an integral frame.

9. The convertible cart of claim 2, wherein the first, second, and top support members of the third frame form an integral frame.

10. The convertible cart of claim 2, wherein the plurality of wheels comprises at least three wheels.

11. A convertible cart comprising:

a. a platform having a body portion with a width, $W_3$;

b. a first frame having a first support member, a second support member, and a top support member connecting the first and second support members, wherein the first support member and the second support member are substantially parallel to each other and define a width, $W_1$, there between, and wherein the first frame is detachably coupled to the body portion of the platform;

c. a second frame having a first support member, a second support member, and a top support member connecting the first and second support members, wherein the first support member and the second support member are substantially parallel to each other and define a width, $W_2$, there between, and wherein the second frame is detachably coupled to the body portion of the platform at a position apart from where the first frame is detachably coupled to the body portion of the platform;

d. a plurality of first coupling connectors configured to detachably engage a corresponding one of the first support member and the second support member of the first frame, and the first support member and the second support member of the second frame, respectively, with the platform;

e. a third frame having a first support member, a second support member, and a top support member connecting the first and second support members, wherein the first support member is detachably coupled to the first frame, and the second support member is detachably coupled to the second frame, respectively;

f. a pair of second coupling connectors, wherein one of the pair of second coupling connectors is configured to detachably engage the first support member of the third frame with the first frame, and the other of the pair of second coupling connectors is configured to detachably engage the second support member of the third frame with the second frame, respectively; and g. a plurality of wheels operable mounted to the platform, wherein $W_3 > W_2 > W_1$, wherein each of the plurality of first coupling connectors comprises one of a 2-way T connector and a 3-way T connector, wherein the plurality of first coupling connectors comprises a first shaft and a second shaft perpendicularly connected to the first shaft, and wherein the first shaft is configured to detachably engage a corresponding one of the first and second support members of the first and second frames, when the frames are in a vertical, erected position, respectively, and the second shaft is configured to detachably engage a corresponding one of the first and second support members of the first and second frames, when the frames are in a horizontal, non-erected position, respectively, wherein the first shaft of the plurality of first coupling connectors has at least a part of its body portion penetrate through the body portion of the platform, and wherein the body portion of the first shaft of the plurality of first coupling connectors penetrating through the platform comprises a helical groove or thread formed on surface thereof.

12. A convertible cart comprising:

a. a platform having a body portion with a width, $W_3$;

b. a first frame having a first support member, a second support member, and a top support member connecting the first and second support members, wherein the first support member and the second support member are substantially parallel to each other and define a width, $W_1$, there between, and wherein the first frame is detachably coupled to the body portion of the platform;

c. a second frame having a first support member, a second support member, and a top support member connecting the first and second support members, wherein the first support member and the second support member are substantially parallel to each other and define a width, $W_2$, there between, and wherein the second frame is detachably coupled to the body portion of the platform at a position apart from where the first frame is detachably coupled to the body portion of the platform;

d. a plurality of first coupling connectors configured to detachably engage a corresponding one of the first support member and the second support member of the first frame, and the first support member and the second support member of the second frame, respectively, with the platform;

e. a third frame having a first support member, a second support member, and a top support member connecting the first and second support members, wherein the first support member is detachably coupled to the first frame, and the second support member is detachably coupled to the second frame, respectively;

f. a pair of second coupling connectors, wherein one of the pair of second coupling connectors is configured to detachably engage the first support member of the third frame with the first frame, and the other of the pair of second coupling connectors is configured to detachably engage the second support member of the third frame with the second frame, respectively; and g. a plurality of wheels operable mounted to the platform, wherein $W_3 > W_2 > W_1$, wherein each of the plurality of first coupling connectors comprises one of a 2-way T connector and a 3-way T connector, wherein the plurality of first coupling connectors comprises a first shaft and a second shaft perpendicularly connected to the first shaft, and wherein the first shaft is configured to detachably engage a corresponding one of the first and second support members of the first and second frames, when the frames are in a vertical, erected position, respectively, and the second shaft is configured to detachably engage a corresponding one of the first and second support members of the first and second frames, when the frames are in a horizontal, non-erected position, respectively, and wherein the first shaft of the plurality of first coupling connectors comprises a body portion defined by a first end and an opposite, second end, and the second shaft comprises a body portion defined by a first side and an opposite, second side, each body portion of the first shaft and the second shaft having a respective channel formed at the center thereof so as to detachably engage a corresponding one of the first and second support members of the first and the second frames, respectively.

13. The convertible cart of claim 12, wherein the first channel extends from the first end to the second end of the body portion of the first shaft, and the second channel extends from the first side to the second side of the body portion of the second shaft.

14. The convertible cart of claim 12, wherein each of the pair of second coupling connectors comprises a body portion defined by a first end and an opposite, second end, each body portion of the pair of second coupling connectors having a respective channel configured to detachably engage a corresponding one of the first and second support members, of the third frame, respectively.

15. The convertible cart of claim 12, wherein the first frame, the second frame and third frame are erectable to corresponding vertical positions so as to form a luggage cart.

16. The convertible cart of claim 12, wherein the plurality of first coupling connectors is held in place by a plurality of nuts.

17. The convertible cart of claim 12, wherein the first support member, the second support member, and the top support member of the first frame form an integral frame.

18. The convertible cart of claim 12, wherein the first support member, the second support member, and the top support member of the second frame form an integral frame.

19. The convertible cart of claim 12, wherein the first support member, the second support member, and the top support member of the third frame form an integral frame.

20. The convertible cart of claim 12, wherein the plurality of wheels comprises at least three wheels.

21. A convertible cart comprising:

a. a platform having a width, $W_3$;

b. a first frame having a width, $W_1$, and detachably coupled to the platform at a first position;

c. a second frame having a width, $W_2$, and detachably coupled to the platform at a second position apart from the first position;

d. a plurality of first coupling connectors configured to detachably engage the first frame and the second frame, respectively, with the platform;

e. a third frame having two ends detachably coupled to the first frame and the second frame, respectively;

f. a pair of second coupling connectors detachably engage the third frame with the first frame and the second frame, respectively; and g. a plurality of wheels operable mounted to the platform, wherein $W_3 > W_2 > W_1$, wherein each of the plurality of first coupling first coupling connectors comprises one of a 2-way T connector and a 3-way T connector, wherein the plurality of first coupling connectors comprises a first shaft and a second shaft perpendicularly connected to the first shaft, and wherein the first shaft is configured to detachably engage a corresponding one of the first frame and second frame when both frames are in a vertical, erected position, respectively, and the second shaft is configured to detachably engage a corresponding one of the first frame and second frame when both frames are in a horizontal, non-erected position, respectively, wherein the first shaft of plurality of first coupling connectors has at least a part of its body portion penetrate through the platform.

wherein the body portion of the first shaft of the plurality of first coupling connectors penetrating through the platform comprises a helical groove or a thread formed on surface thereof 22. The convertible cart of claim 21, wherein the first shaft of the plurality of first coupling connectors comprises a body portion defined by a first end and an opposite, second end, and the second shaft comprises a body portion defined by a first side and a second, opposite side, each body portion of the first shaft and the second shaft having a respective channel formed at the center thereof so as to detachably engage a corresponding one of the first frame and the second frame, respectively.

23. The convertible cart of claim 22, wherein the first channel of the first shaft extends from the first end to the second end of the body portion of the first shaft of the plurality of first coupling connectors, and the second channel of the second shaft extends from the first side to the second side of the body portion of the second shaft of the plurality of first coupling connectors.

24. The convertible cart of claim 21, wherein the pair of second coupling connectors comprises a body portion defined by a first end and an opposite, second end, each body portion of the pair of second coupling connectors having a respective channel configured to detachably couple the third frame to the first frame and the second frame, respectively.

25. The convertible cart of claim 21, wherein the first frame, the second frame, and third frame are erectable to corresponding vertical positions so as to form a luggage cart.

26. The convertible cart of claim 21, wherein the plurality of first coupling connectors is held in place by a plurality of nuts.

27. The convertible cart of claim 21, wherein the plurality of wheels comprises at least three wheels.

* * * * *